March 30, 1937. J. SOFFEL 2,075,670
CAMERA BACK AND FOCUSING DEVICE
Filed May 29, 1935
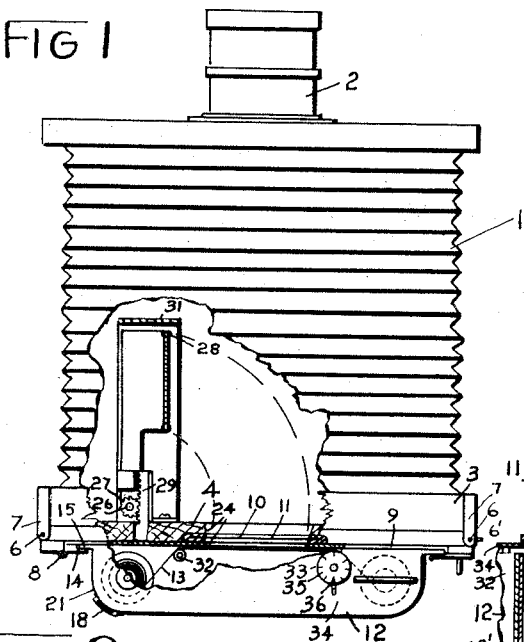
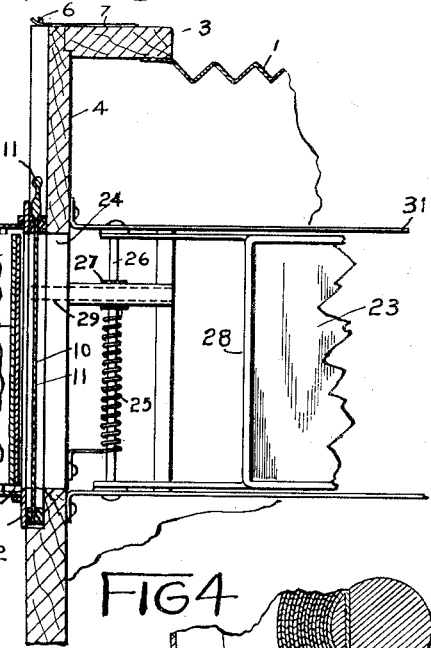
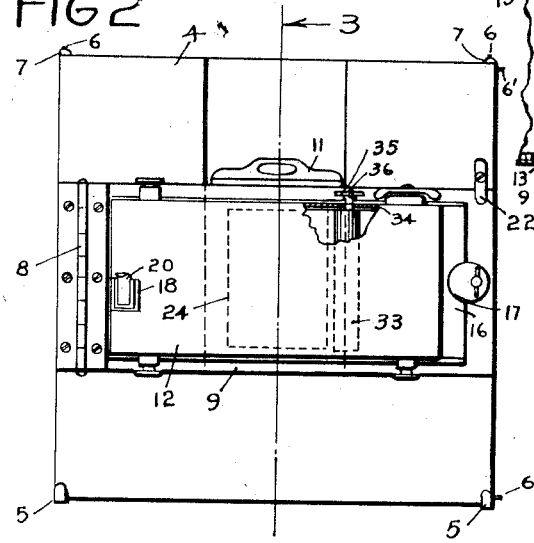
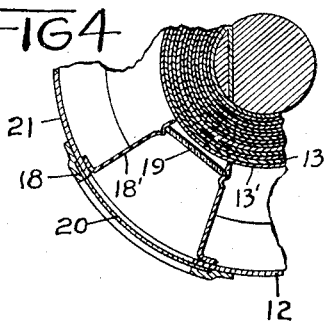
INVENTOR.
JOHN SOFFEL
BY 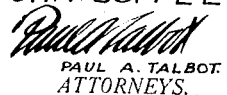
PAUL A. TALBOT.
ATTORNEYS.

Patented Mar. 30, 1937

2,075,670

UNITED STATES PATENT OFFICE 2,075,670

CAMERA BACK AND FOCUSING DEVICE

John Soffel, Teaneck, N. J.

Application May 29, 1935, Serial No. 24,030

4 Claims. (Cl. 95—42)

My invention relates to attachments to cameras and more particularly to a reducing back attachment for professional portrait cameras to facilitate the use of roll films and for focusing the full size image as exposed to the film as well as revealing and indicating by measuring the film or that portion to be exposed.

Some of the objects of my invention are:

To provide a reducing back to replace and to be substituted for the back ordinarily used to receive the plate holder.

To provide a roll film adapter suitable to substantially reduce the dimensions of the exposure aperture of the camera back and thus utilize the advantages of a lens of long focal length.

To provide a ground glass moved into the focal plane and exposure aperture and out of the exposure aperture automatically by the movement of the film adapter.

To provide a means of measuring the portion of the roll film to be exposed and an indicating dial to show the movement of the required distance in winding the film for the exposure To provide a window and slide to reveal the numbers on the paper supplied and wound with the film spool and to prevent light penetration when not in use I accomplish these and other objects by the construction herein described and shown in the accompanying drawing in which:

Fig 1 is a plan view of my device.

Fig. 2 is a rear elevation.

Fig. 3 is a fragmentary vertical section at 3 Fig. 2.

Fig. 4 is a fragmentary view of the window of my device.

Similar reference characters refer to similar parts throughout the several views of the accompanying drawing forming a part hereof and in the following specifications.

The camera (1) having the lens (2) may be any of the well known makes in which a back frame (3) is provided to which is removably secured the back for holding the usual plate holders which need not be described or shown as my roll film reducing back (4) is adapted to replace it.

The reducing back 4 may be held in place by the lower fittings 5, and by the pins 6 which engage the apertured springs 7. The reducing back 4 may also be applied in a position at 90 degrees from that shown in the drawing and in such position, pins 6' engage the apertured springs 7.

Secured to the back (4) by means of the hinge (8) is the exposure apertured plate (9) and the slide frame (10) into which the removable slide (11) is placed when it is desired to swing the film adapter (12) during the period between exposure of part of the film (13).

The apertured plate (9) is provided at one end with the groove (14) adapted to receive the lip (15) of the film adapter (12) which at its opposite end is provided with the lip (16) engaging the rotatable button (17) secured to the opposite end of the aperture plate (9).

By turning said button the film adapter (12) may be removed from said aperture plate (9) as is necessary when renewing or removing the roll of film or spools which are inserted into the adapter in the same manner as is employed in many of the small amateur cameras commonly used. The roll films used in my device may also be identical with the standard sizes in common use in which opaque paper having numbers on its back surface may assist in acquainting the operator when the film has to be turned to the proper position for exposure.

The film adapter (12) has a window (18) for the purpose of reading the numbers on the paper wound with the roll of film and is preferably provided with a green screen (19) and a slidable opaque cover (20) to prevent light from entering said adapter (12). It will be seen also that the window (18) and its cover (20) are positioned on the curved end (21) of said adapter which by reason of the curvature of said cover stiffens it thereby permitting the use of thinner metal in its construction. Projecting inwardly and contacting the paper (13') wound with and back of the film (13) I have provided the hood (18') which is curved at its inner end to conform with the curvature of the rolled film, and having its axis to the film roll.

I have provided a swingingly mounted finger (22) adapted to hold said adapter (12) and the apertured plate (9) against said back (4) in its normal position and when focusing said finger (22) may be swung out of engagement permitting the parts carried with said adapter to swing on said hinge (8) out of position.

On the interior of the camera and swingingly mounted on the reducing back (4) I have provided the ground glass (23) which is forced to swing into the exposure aperture (24) of said back (4) and into the focal plane by means of the spring (25) preferably mounted on the pinion shaft (26) on which is secured the pinion (27) and the frame (28) to which is secured the ground glass (23).

Engaging said pinion (27) is the rack (29) slidably mounted in said back (4) and projecting therethrough to engage the aperture plate (9) thereby causing said rack to be forced to revolve said pinion and to swing the ground glass (23) out of the focal plane and the optical axis of the lens (2) when said aperture plate (9) is swung against said back (4) permitting the film (13) to replace said ground glass (23) at the focal plane for the purpose of exposure. Thus the ground glass or its equivalent may be automatically brought into and out of the focal plane of the lens of the camera.

To protect the ground glass and the parts operating it when said back (4) is removed from the camera I have provided the guard (31).

To bring the film into the same focal plane as the ground glass (23) it will be noted that the film passes over the rollers (32) and (33). The roller (33) is preferably so mounted in said film adapter (12) as to extend through the upper wall (34) thereof and is provided with a calibrated dial (35) which combined with the pointer (36) indicates the position of the film when turned for the next exposure: the roller (33) being of the same circumference as the length of that portion of the film being exposed.

As aforeindicated, the herein described invention provides an attachment for professional portrait cameras in the form of a reducing back. Thru the use of the reducing back there will be obtained a photograph of a reduced size embodying all the characteristics and features of a photograph exposed thru a lens of long focal length. The reducing back is easily removed and positioned on a professional portrait camera and is substituted for the usual plate holding back.

I have shown and described my invention in detail herein but it is obvious that the construction may vary to suit the conditions of operation and the camera and other parts to which it may be applied and I do not wish to be limited to the details above described and shown in the accompanying drawing but may depart therefrom within the scope of the appended claims which succinctly set forth my invention.

I claim:

1. In combination with a camera, of a reducing back comprising a plate detachably connected to the camera, an apertured exposure plate pivotally connected to said detachable plate, a slide positioned in a frame attached to the interior of the apertured exposure plate, a ground glass supporting frame swingably mounted on the interior of said detachable plate for moving the ground glass into and out of the focal plane and means for actuating said frame upon the pivotal movement of the apertured exposure plate.

2. In combination with a camera, of a reducing back comprising a plate detachably connected to the camera, an apertured exposure plate pivotally connected to said detachable plate, a slide positioned in a frame attached to the interior of the apertured exposure plate, a ground glass supporting frame swingably mounted on the interior of said detachable plate for moving the ground glass into and out of the focal plane, means for actuating said frame, said means comprising a pinion gear carried by said frame and engageable with a rack slidably mounted in the detachable plate.

3. In combination with a camera, of a reducing back comprising a plate detachably connected to the camera, an apertured exposure plate pivotally connected to said detachable plate and normally lying flush therewith, a frame mounted on the interior of said detachable plate, means carried by said frame and pivotally supporting a ground glass, said means including a vertical shaft rotatably mounted in said frame, means for actuating said shaft for moving the ground glass into and out of the focal plane, said means including a pinion gear carried by said shaft and engageable with a rack slidably mounted in said plate.

4. In combination with a camera, of a reducing back comprising a plate detachably connected to the camera, an apertured exposure plate pivotally connected to said detachable plate, a slide positioned in a frame attached to the interior of the apertured exposure plate, means carried by said apertured exposure plate for supporting a roll film, a ground glass supporting frame swingably mounted on the interior of said detachable plate for moving the ground glass into and out of the focal plane, means for actuating said frame, said means comprising a pinion gear carried by said frame and engageable with a rack slidably mounted in the detachable plate.

JOHN SOFFEL.